(12) United States Patent
Rault et al.

(10) Patent No.: US 8,875,919 B2
(45) Date of Patent: Nov. 4, 2014

(54) STOPPER FOR CLOSING A DISPENSING OPENING OF A CONTAINER

(75) Inventors: Stephane Rault, Paris (FR); Jacquy Lebon, Challands (FR)

(73) Assignee: Clariant Production (France) SAS, Choisy le Roi (FR)

( * ) Notice: Subject to any disclaimer, the term of this patent is extended or adjusted under 35 U.S.C. 154(b) by 423 days.

(21) Appl. No.: 13/098,545

(22) Filed: May 2, 2011

(65) Prior Publication Data

US 2011/0297636 A1 Dec. 8, 2011

(30) Foreign Application Priority Data

Jun. 8, 2010 (EP) ..................................... 10305608

(51) Int. Cl.
| | |
|---|---|
| *B65D 39/16* | (2006.01) |
| *B65D 50/04* | (2006.01) |
| *B29C 45/14* | (2006.01) |
| *B65D 39/00* | (2006.01) |
| *B65D 51/30* | (2006.01) |
| *B29C 45/00* | (2006.01) |

(52) U.S. Cl.
CPC ............... *B65D 50/045* (2013.01); *B29C 45/14* (2013.01); *B65D 39/007* (2013.01); *B65D 51/30* (2013.01); *B29C 45/0053* (2013.01); *B65D 2101/0038* (2013.01); *B65D 2215/04* (2013.01)
USPC ........... 215/305; 215/355; 215/364; 220/801; 220/805; 220/254.9; 220/348; 220/345.4

(58) Field of Classification Search
CPC .......... B65D 51/30; B65D 2101/0038; B65D 39/007; B65D 50/045; B65D 2215/04; B65D 2215/00; B65D 2543/00824; B65D 2543/00851; B65D 2543/00833; B65D 39/16
USPC ............ 215/305, 355, 364, 45, 253; 220/801, 220/345.1–345.6, 348–351, 805, 254.4, 220/254.9
See application file for complete search history.

(56) References Cited

U.S. PATENT DOCUMENTS

| | | | | |
|---|---|---|---|---|
| 2,173,046 | A | | 9/1939 | Smith |
| 2,766,796 | A | * | 10/1956 | Tupper .......................... 220/521 |

(Continued)

FOREIGN PATENT DOCUMENTS

| | | |
|---|---|---|
| FR | 892608 | 5/1944 |
| FR | 2624106 | 6/1989 |

(Continued)

OTHER PUBLICATIONS

Extended European Search Report (EESR), dated Jan. 13, 2011, with respect to Application No. 10305608.1-1261.

*Primary Examiner* — Fenn Mathew
*Assistant Examiner* — James N Smalley
(74) *Attorney, Agent, or Firm* — Scott R. Cox

(57) ABSTRACT

The present invention pertains to a stopper (1) for closing a dispensing opening (70) of a container (8). The stopper comprises a body element (2) for closing the dispensing opening, the body element having a top face (20) and a bottom face (22), the bottom face being directed towards the inside of the container; a moving element (3) which is situated at the top face (20) of the body element (2), wherein the moving element is movable relative to the body element from an initial position in which the moving element does not extend beyond the outer extension of the top face (20) in the plane of the top face of the body element, to an opening position in which the moving element is moved relative to the body element to extend at least partly beyond the outer extension of the top face (20) of the body element (2) in the plane of the body element, wherein the moving element provides, in the opening position, a gripping surface (32) for a user to remove the body element from the dispensing opening. The moving element substantially covers the entire top face of the body element in the initial position.

19 Claims, 7 Drawing Sheets

(56) References Cited

U.S. PATENT DOCUMENTS

| | | |
|---|---|---|
| 2,918,167 A | 12/1959 | Lowen |
| 3,435,988 A | 4/1969 | Jonas et al. |
| 3,517,855 A | 6/1970 | Hillis |
| 3,581,934 A | 6/1971 | Sciascia |
| 3,625,386 A * | 12/1971 | Schaefer .................. 215/215 |
| 3,792,803 A * | 2/1974 | Kessler .................... 222/511 |
| 3,921,851 A | 11/1975 | Nilson |
| 4,228,920 A | 10/1980 | Burton |
| 4,240,564 A | 12/1980 | Pritchard |
| 4,266,690 A | 5/1981 | Holmes et al. |
| 4,458,819 A * | 7/1984 | Geiger ..................... 215/224 |
| 4,782,981 A | 11/1988 | Schuster |
| 4,834,234 A * | 5/1989 | Sacherer et al. ............. 206/204 |
| 5,285,917 A * | 2/1994 | Hoffmann ............... 220/212.5 |
| 5,299,702 A | 4/1994 | Kneer et al. |
| 5,505,308 A | 4/1996 | Eikmeier et al. |
| 5,736,616 A | 4/1998 | Ching et al. |
| 5,788,064 A | 8/1998 | Sacherer et al. |
| 5,791,515 A | 8/1998 | Khan et al. |
| 6,221,446 B1 * | 4/2001 | Hekal ..................... 428/34.1 |
| 6,334,974 B1 | 1/2002 | Chen |
| 6,497,845 B1 | 12/2002 | Sacherer |
| 6,976,577 B2 * | 12/2005 | Devine ..................... 206/37 |
| 7,721,905 B2 * | 5/2010 | Metzdorf ................. 220/254.4 |
| 8,336,723 B2 * | 12/2012 | Kneer et al. .................. 215/355 |
| 2001/0035424 A1 * | 11/2001 | Combe et al. ................. 220/835 |
| 2003/0010668 A1 | 1/2003 | Taskis et al. |
| 2006/0169603 A1 | 8/2006 | Lancesseur et al. |
| 2008/0210712 A1 * | 9/2008 | Rault et al. ............... 222/153.14 |
| 2009/0101621 A1 * | 4/2009 | Kneer et al. .................. 215/355 |
| 2012/0302948 A1 * | 11/2012 | Nassiri et al. .................. 604/78 |

FOREIGN PATENT DOCUMENTS

| | | |
|---|---|---|
| FR | 2709475 | 3/1995 |
| GB | 539891 | 9/1941 |
| GB | 1074165 | 6/1967 |
| GB | 2210603 | 6/1989 |
| JP | 9315455 | 12/1997 |
| JP | 2003118758 | 4/2003 |
| WO | 9409084 | 4/1994 |
| WO | 9528338 | 10/1995 |
| WO | 9851758 | 11/1998 |
| WO | 9948963 | 9/1999 |
| WO | 2004024593 | 3/2004 |
| WO | 2006040019 | 4/2006 |

* cited by examiner

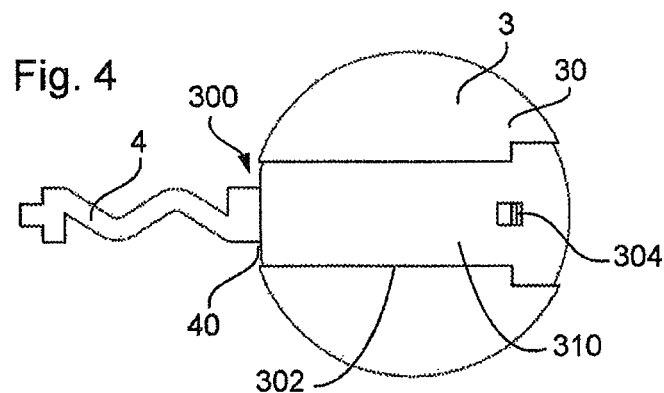
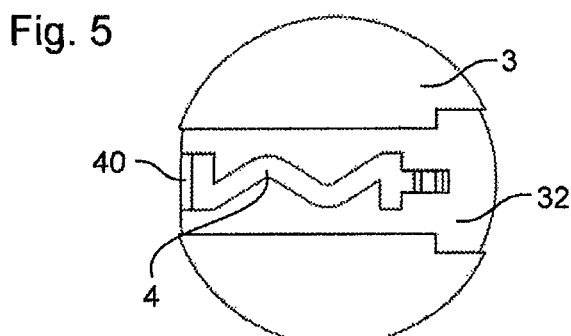
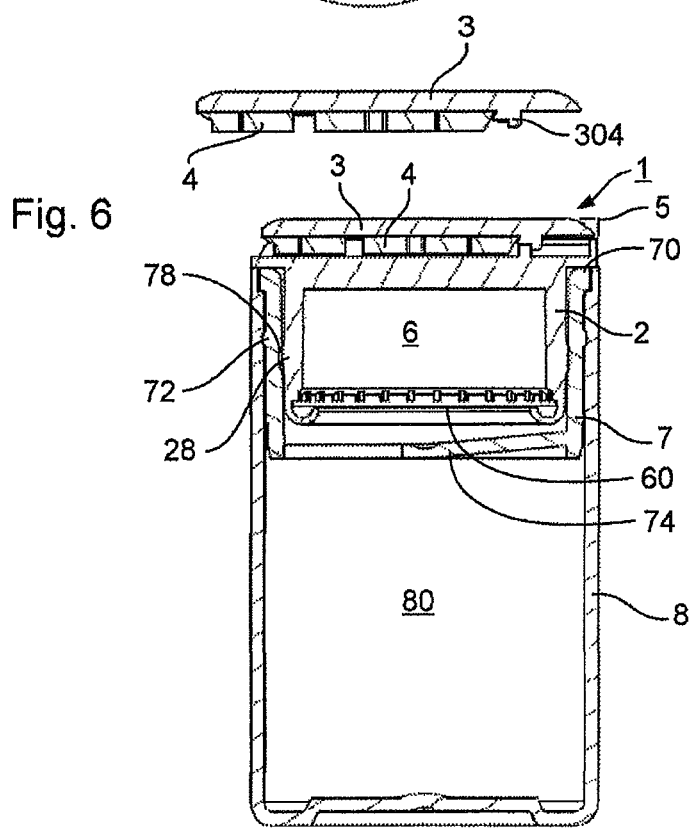

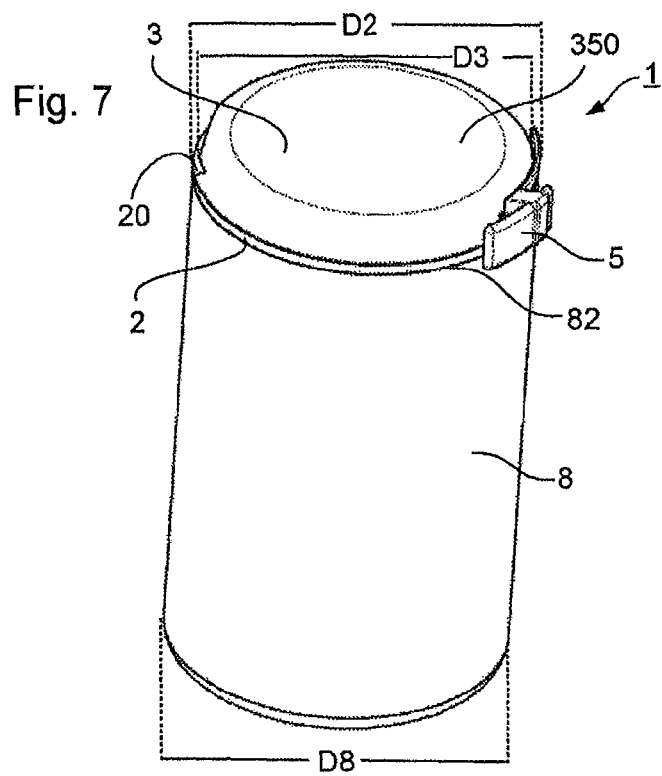
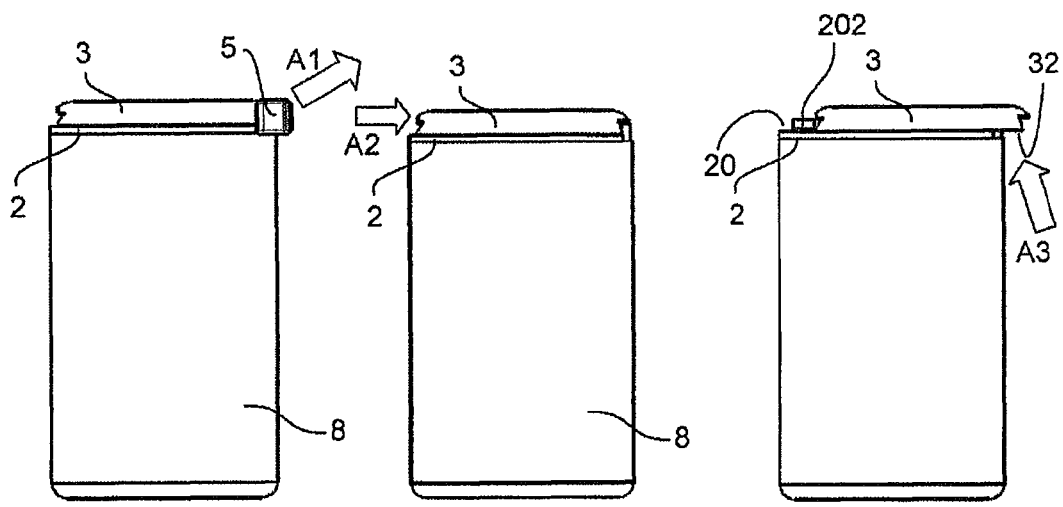
Fig. 7
Fig. 8  Fig. 9  Fig. 10

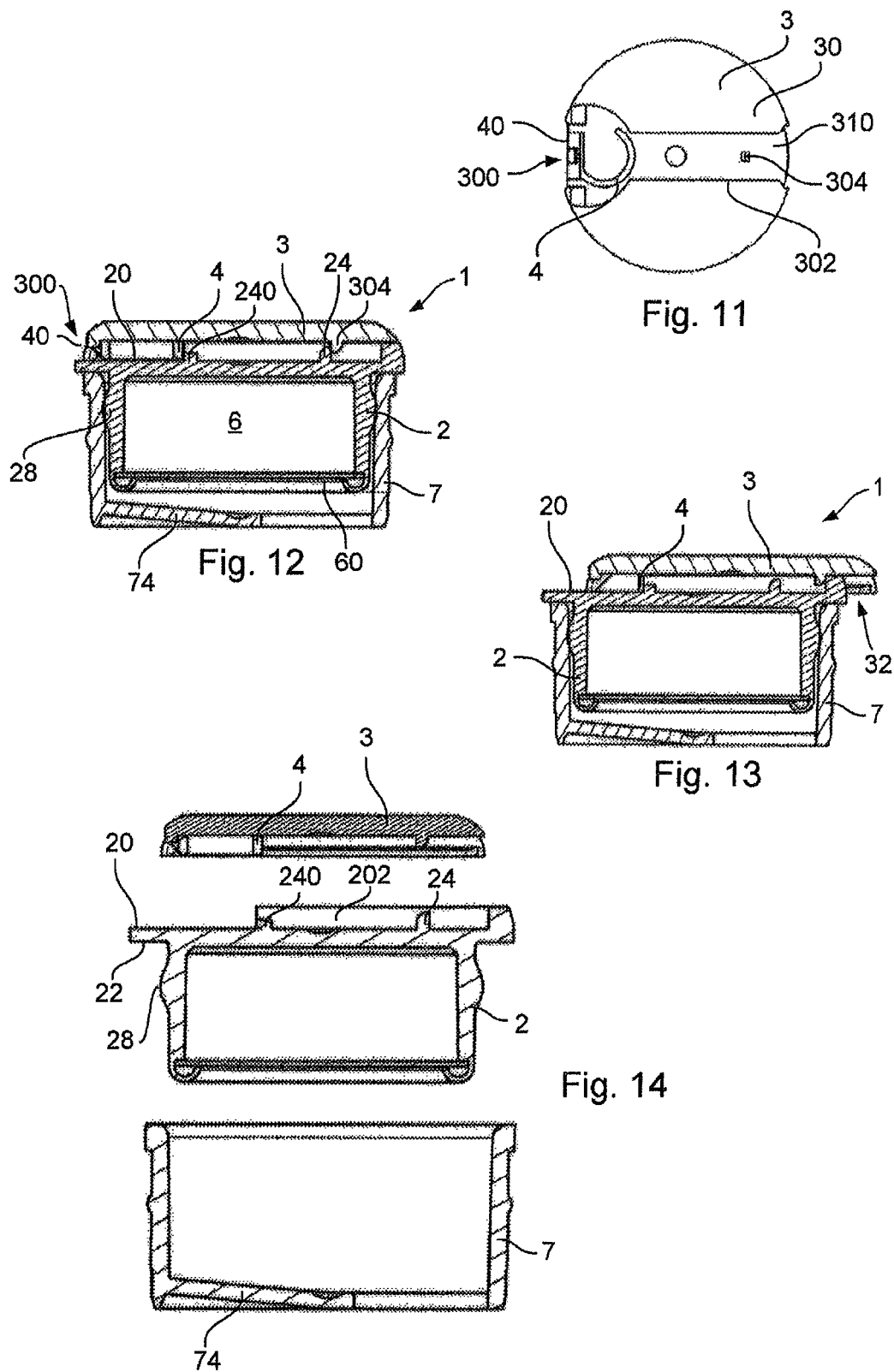

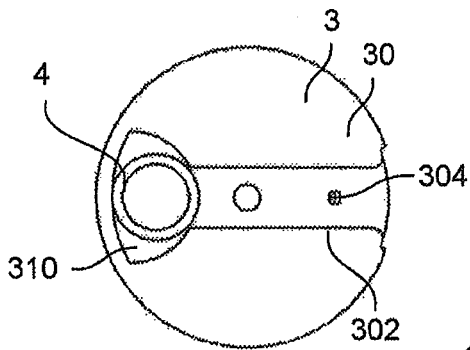
Fig. 15
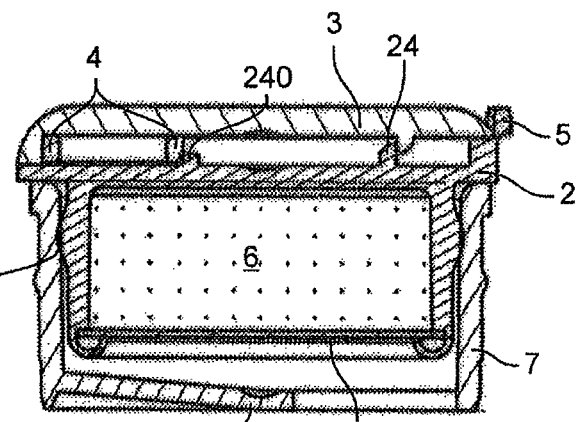
Fig. 16
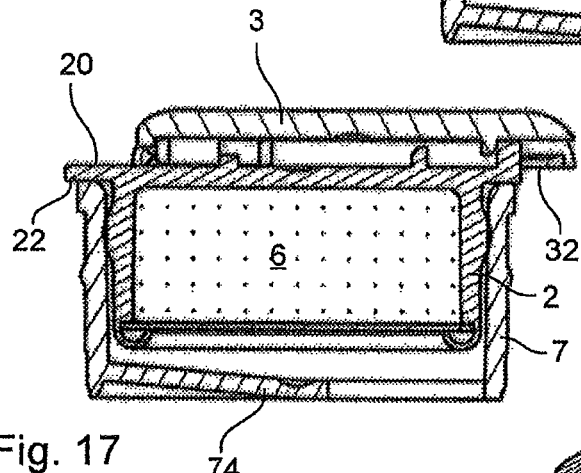
Fig. 17
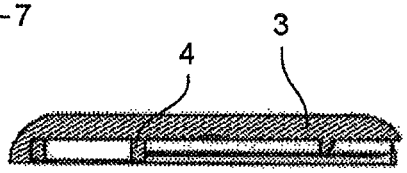
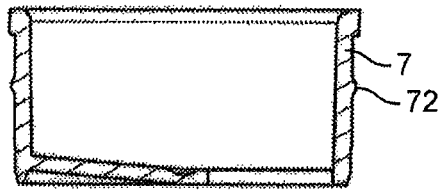
Fig. 18

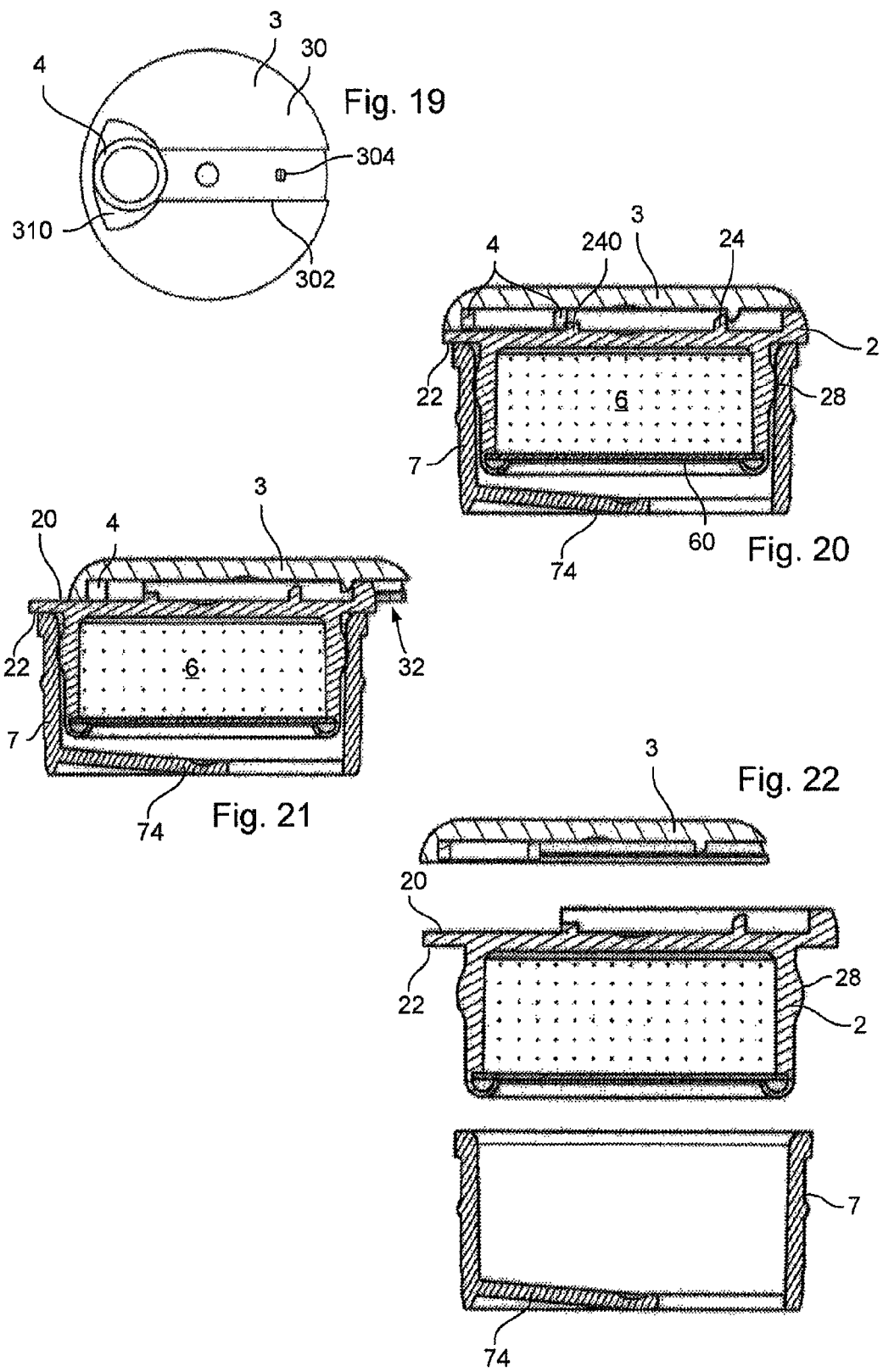

STOPPER FOR CLOSING A DISPENSING OPENING OF A CONTAINER

TECHNICAL FIELD

The present invention pertains to a stopper for closing a dispensing opening of a container, the stopper having childproof characteristics.

TECHNICAL BACKGROUND

Stoppers for closing the dispensing openings of containers are generally known. For containers which are intended to contain powders, granulates, pills, tablets, dragées or any other products in the pharmaceutical or chemical domain, it might be crucial that their respective stoppers cannot be opened or removed by children. This is in particular the case for containers which contain medicine or other substances that can be dangerous when taken in an uncontrolled manner.

Furthermore, it is often desirable to determine whether the container has already been opened or whether it is in its originally distributed state. In particular, when it comes to the distribution of medicine, it is relevant for the end-user to know whether the container, which contains the medicine, has been tampered with and whether the user can be sure that the medicine contained in the container is original and untouched.

In order to accommodate for these needs, stoppers are provided which include a tamper-evident member which has to be removed or fractured from the stopper and/or the container before the dispensing opening of the container can be opened for the first time. These tamper-evident members are typically provided in the form of a tear-off ring, a tear-off strip or in the form of foils.

In order to make sure that the stopper cannot be opened by small children, different techniques and concepts have already been suggested in the prior art. Some of these concepts require that the stopper be opened according to a procedure which requires at least two consecutive complex movements. For example, the user has to push the container in order to gain access to an edge of a stopper which then has to be pushed in a direction perpendicular to the initial pushing direction in order to remove the stopper from the container.

A different concept is provided in U.S. Pat. No. 5,299,702 which relates to a stopper for a receptacle. According to this concept, a slide is provided in an upper portion of a stopper, wherein the upper portion of the stopper includes two head sections which project beyond the container and between which the slide is arranged.

In order to open the stopper according to this concept, the slide has to be pushed on its outer circumferential edge in order to provide, at the other side thereof, an edge to lift the stopper and remove it from the dispensing opening.

SUMMARY

Starting from the prior art mentioned above, it is an object of the present invention to provide a stopper for closing a dispensing opening of a container with improved childproof characteristics and, at the same time, improved handling and design characteristics.

This objective is solved by a stopper for closing a dispensing opening of a container with all features of claim 1.

Accordingly, the stopper has a body element for closing the dispensing opening, the body element having a top face and a bottom face, wherein the bottom face is directed towards the inside of the container. A moving element is provided which is situated at the top face of the body element, wherein the moving element is movable relative to the body element from an initial position in which the moving element does not extend beyond the outer extension of the top face in the plane of the top face of the body element, to an opening position in which the moving element is slid relative to the body element to extend at least partly beyond the outer extension of the top face of the body element in the plane of the body element. The moving element provides, in the opening position, a gripping surface for a user to remove the body element from the dispensing opening. The moving element substantially covers the entire top face of the body element in the initial position.

By the provision of a moving element in the form as stated above, namely that the moving element is situated on the top face of the body element and substantially covers the entire top face of the body element in the initial position, there are several advantages over the known solutions, from a handling perspective, from a childproof perspective as well as from a design perspective. In particular, when viewing the stopper from the top, only the moving element is visible. In particular if the moving element is symmetric it is not obvious that there is a moving element and in which direction it has to be operated.

From a handling perspective, the user is now free to choose the location where to push the moving element in order to move it from its initial position to the opening position, because the user can touch the moving element in any position on the top surface of the moving element. In the stoppers of the prior art, the user was required to push the slide at a specific position at the edge of the slide, which could be cumbersome to find or to reach, in particular when trying to push it the right position for people with large hands.

The moving element according to the present disclosure has the advantage that the user has an extended surface, to which he can connect, preferably frictionally, with his fingers in order to move the moving element from the initial position to the opening position. This greatly improves the handling in terms of user friendliness.

With respect to the childproof aspects of the moving element according to the preset disclosure, it becomes immediately apparent that it is less obvious for a child that the moving element, which represents substantially the entire top face of the stopper, is movable at all. To the young child, the moving element appears to be solitary with the remainder of the container and not movable at all. Furthermore, a specific direction into which the moving element can be moved beyond the outer extension of the body element is not immediately apparent because a defined direction cannot be gathered from the appearance of the top surface of the stopper alone, in particular as the moving element substantially covers the entire top surface. Accordingly, it becomes more difficult for a small child to figure out whether the moving element can be moved at all, and into which direction the moving element can be moved after the child has eventually figured out that the moving element is movable at all.

The movement of the movable element for moving it between the initial position and the opening position can either be a linear movement, preferably in the form of a sliding movement, or a rotating movement from an initial position to an opening position. Naturally, sliding and rotating movements can be combined. In case a sliding movement is chosen, the movable element can also be regarded a sliding element.

With respect to the design aspects, it will become apparent that the moving element and the body element as described above can be manufactured more easily, in particular by injection moulding, than the stoppers of the prior art. In addition, the stoppers are easier to assemble than the stoppers of the prior art. Accordingly, from a design perspective, the stopper according to the present invention has the advantage that it is easier to produce, manufacture and assemble.

Preferably, the body element includes a desiccant chamber at its bottom face, in particular directed towards the inside of the container. The provision of a desiccant chamber enables the provision of a desiccant to be filled into the stopper and/or to be inserted into the body element of the stopper in order to desiccate the contents of the container. The body element of the stopper may include a bottom face defining a hollow space into which an active substance can be filled which is intended to regulate the gaseous atmosphere inside of the volume of the container.

The body element can also be made at least partly from a desiccant material, and/or an oxygen absorber and/or a gas absorber, in particular from a resin including a desiccant, and/or an oxygen absorber and/or a gas absorber. The advantage of this embodiment is that the contents of the container can be desiccated or protected from gases by means of the body element of the stopper.

The stopper may include means to regulate the gaseous atmosphere within the container. The means may include active substances in the form of the desiccant material, oxygen absorbers or gas absorbers mentioned above, but may also include any sort of absorbers, scavengers, active carbons, means for moisture control, means for oxygen control and the like.

It is apparent that the stopper defined above is particularly well suited for packaging drugs, in particular drugs which need a controlled gaseous atmosphere in the container in which they are intended to be packaged.

The top face of the body element may have dimensions smaller than, or equal to, the outer dimensions of the container in a plane of the top face of the body element. Furthermore, the moving element may have dimensions smaller than or equal to the dimensions of the top face of the body element in the plane of the top face of the body element and/or to the container at a position in which the body element is connected to the container. This has the advantage that in the initial position of the moving element, no edges are present which could be used to lift off the stopper from the dispensing opening. Accordingly, it is impossible to remove the stopper from the dispensing opening such that the childproof feature is even improved.

In other words, the moving element, the top face of the body element and the outer dimensions of the container in the plane of the top face provide a smooth transition between the respective parts, making it impossible to grip the moving element or the body element to open the dispensing opening. The outer dimensions of the top face and, subsequently, the outer dimensions of the moving element in the plane of the top face can also be smaller than the outer dimensions of the container in the plane of the top face. In case the outer dimensions of the moving element are smaller than the outer dimensions of the container, it is even more assured that a user cannot open the stopper without moving the moving element from the initial position into the opening position. It is important, however, that the outer dimensions of the moving element do not extend beyond the outer extensions of the top face of the body element and/or the outer extension of the container at the section at which the stopper connects to the container, in the plane of the top face of the body element.

The moving element may be mounted to the top face of the body element by means of a positive locking rail element, in particular by means of a dovetail positive lock, to allow for the movement of the moving element from the initial position to the opening position. In this respect, the moving element may be mounted to the body element by mounting means situated at the bottom face of the moving element only. By means of the provision of a positive locking fit between the moving element and the body element, it can be made sure that the moving element and the body element are securely fastened to one another, despite being movable. In particular, it becomes possible transferring a force from the moving element in its opening position onto the body element, in order to be in a position to remove the body element from the container.

The body element may be shaped such that it does not extend beyond the plane defined by the moving element in a direction perpendicular to the plane defined by the moving element. In other words, at the end face of the stopper only the moving element is present. This improves the childproof function even more because it camouflages the fact that the moving element is actually movable.

The moving element may be spring-biased with respect to the body element towards the initial position such that the moving element always returns to the initial position even after having been displaced into the opening position.

The moving element may include a spring element which is integrally moulded with the moving element. The spring element might be moulded in the same plane as the moving element and be hinged to the moving element by means of a foil hinge. By the provision of the spring element integrally moulded to the moving element, a very reliable connection between the spring element and the moving element can be achieved. When the moving element and the spring element are moulded in the same plane, the moulding process as such can be very simple and effective because the mould as such can be made as a relatively simple one-layered mould.

The spring element may be integrated with the moving element by means of a foil hinge such that it can be folded into the working position by pivoting the spring element from its manufactured position into its active position by tilting it by 180°, such as to be adjacent to the bottom face of the moving element.

In an alternative embodiment, the spring element may be provided separate from the moving element and the spring element is associated with the moving element, preferably situated in a recess of the moving element. Preferably, the spring element is made from a material different than that of the moving element. This has the advantage that the spring element can be made from a material which is suitable for the spring action of the spring element and the moving element can be manufactured from a more economical material. Furthermore, the provision of the separate spring element obviates the need for the step of folding the spring element below the moving element such that one relatively complex process step can be avoided.

To movably connect the moving element with the body element, the moving element may include a recessed portion including a positive locking element. This recess may be dimensioned to receive the spring element in order to provide for a compact arrangement.

To further improve the manufacturing characteristics, a clip element may be provided in the recess which is intended to maintain the spring element in its active position.

A clip element may be provided which is intended to block the movement of the moving element in one direction such as to make sure that the moving element does not fall off the body element, once assembled.

A skirt may be present which is to be inserted into the container to define the dispensing opening, the body element being insertable into the skirt in order to close the dispensing opening. This skirt may include a flow reducer to reduce the flow of products to be dispensed through the dispensing opening. The skirt and/or the flow reducer may be made from a material including a desiccant, and/or an oxygen absorber and/or a gas absorber, in particular a resin including a desiccant, and/or an oxygen absorber, and/or a gas absorber.

In order to provide for tamper-evidence, a tamper-evident member may be provided to prohibit the movement of the moving element from the initial position to the opening position, wherein the tamper-evident member is removable by a user. The tamper-evident member may extend above the top face of the body element and is integrally moulded with the body element.

The body element may be hinged to the container by means of a foil hinge, preferably hinged to the skirt. The body element may be attached to the container or the skirt by means of a positive locking, a press-fit or any other suitable locking mechanism.

Preferably, the top surface of the moving element is provided with a hot-die print, a hot stamp print, a serigraphy, a tampo print and/or an in-mould print. By means of the provision of the print on the top surface of the moving element, the moving element is designed such as to allow a decoration which may be intended to provide information about the use of the container, in particular instructions for opening the container, and/or information with respect to the drug contained in the container, for example its brand name.

Designing a moving element in the form as claimed allows a maximum of the surface of the moving element to be available as the decoration/printing surface.

BRIEF DESCRIPTION OF THE DRAWINGS

Further features and advantages of the invention will become clear from the following detailed description of the Figures in which:

FIG. 4 is a bottom view of the moving element with a spring element in its manufactured position;

FIG. 5 shows the moving element of FIG. 4 with the spring element arranged in its active position;

FIG. 6 shows a container with the stopper and a skirt in a schematic cross-sectional view;

FIG. 7 shows the container with the stopper in a perspective side view;

FIG. 8 shows the container in a perspective side view, with the moving element in its initial position and the tamper-evidence member in place;

FIG. 9 shows the container of FIG. 8 in a perspective side view with the tamper-evident member removed;

FIG. 10 shows the container of FIGS. 8 and 9 in a configuration in which the moving element is moved into the opening position;

FIGS. 11 to 14 show a stopper in another embodiment, having a semi-circular spring element hinged to the moving element;

FIGS. 15 to 18 show a stopper in yet another embodiment with a spring element inserted into a receiving portion, the stopper having a tamper-evidence member;

FIGS. 19 to 22 show a stopper in yet another embodiment with a spring element inserted into a receiving portion but without a tamper-evidence member;

DETAILED DESCRIPTION OF THE FIGURES

Figure 1:
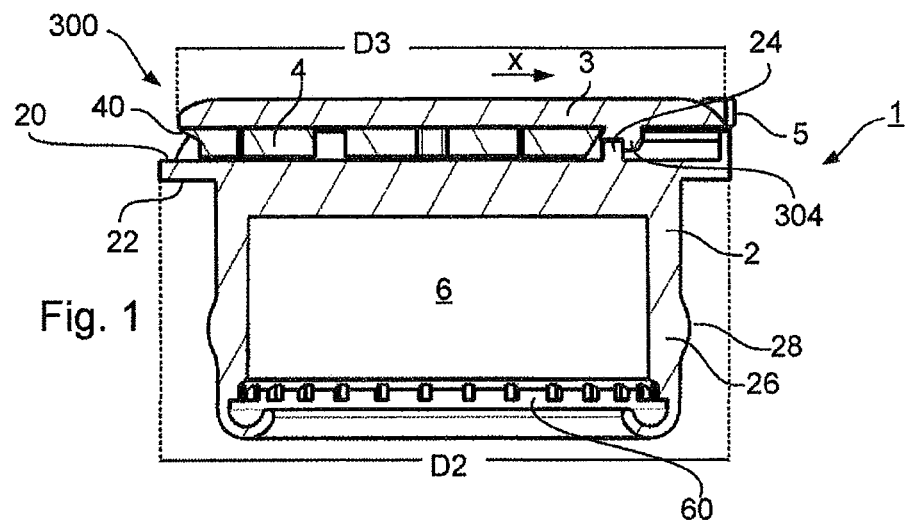
FIG. 1 is a cross-sectional view of a stopper with a moving element and a body element, a desiccant chamber and a tamper-evident member.

In the following, the disclosure will be explained in more detail by reference to the drawings of the Figures. In the Figures, same reference numerals are used to indicate like elements or like functional entities and repeated description thereof may be omitted in order to reduce redundancies.

FIG. 1 shows a stopper 1 in a first embodiment in a schematic cross-section. The stopper 1 includes a body element 2 which is intended to close a dispensing opening in a container, the body element 2 having a top face 20 and a bottom face 22, wherein the bottom face 22 is directed towards the inside of the container.

Typically, the body element 2 is designed such that it fully closes and/or seals the respective dispensing opening of a container. In other words, if the body element 2 is present in the dispensing opening, it closes the container fully. In particular, it seals the dispensing opening in a moisture tight manner such that the contents inside of the container stay dry when the body element 2 is present.

A moving element 3 is situated on the top face 20 of the body element 2. The moving element 3 can be moved from the initial position, which is shown in FIG. 1, to an opening position in which the moving element extends beyond the outer dimensions defined by the top face 20 of the body element 2. In the embodiments shown herein, the moving element 3 is moved from the initial position to the opening position in a linear fashion. Accordingly, the moving element 3 performs a sliding movement from the initial position to the opening position, and vice versa. Accordingly, the moving element can be regarded a sliding element 3.

The moving element 3 is intended, in the opening position in which it extends beyond at least the outer extension of the top face of the body element, to provide a gripping means for a user to be in a position to remove the body element 2 from the container, such that the product can be dispensed from the container. This will be further exemplified by the description of FIGS. 8 to 10 below.

The moving element 3 substantially covers the entire top face 20 of the body element 2 in the initial position. Even though it may be appreciated that a small section on the left-hand side of the top face 20 of the body element 2 appears not to be covered by the moving element, the moving element 3 is still considered to cover substantially the entire top face of the body element. The small section which is not covered by the moving element 3 is attributed to a flattened portion 300 of the moving element 3 which serves, as can be derived from FIGS. 4 and 5, to provide a support for a spring element 4 which is, in this embodiment, integrally moulded with the moving element 3.

In particular, the dimensions D3 of the moving element 3 in the plane of the top face 20 do not extend beyond the dimensions D2 of the body element 2. In case the moving element 3 is provided substantially in the form of a disk, this implies that the diameter of the disk, which corresponds to the outer dimensions D3 of the disk, is equal to or smaller than the diameter of the body element 2, which corresponds to the outer dimension D2.

In FIG. 1, the spring element 4 is shown to be situated below the moving element 3 and above the top face 20 of the body element 2. The spring element 4 spring-biases the moving element 3 into the initial position, in which it does not extend beyond the outer dimensions of the body element 2 in the plane of the top face 20.

If the moving element 3 is moved from its initial position, as shown in FIG. 1, to its opening position, i.e. such that it extends beyond the outer dimension of the top face 20 of the body element 2 in the plane of the top face 20, the spring element 4 pushes the moving element 3 back into its initial position, if released.

The moving element 3 can be moved into direction X from its initial position, as shown in FIG. 1, to the opening position. At the top face 20 of the bottom element, a nose 24 is present against which the spring element 4 abuts. The nose 24 serves as a counter-mount to the spring element 4 such that the spring element 4 can push against the nose 24 in order to move the moving element 3 back into its initial position.

In FIG. 1, a tamper-evident member 5 in the form of a tear-off strip is shown which keeps the moving element 3 in its initial position, while being present. In other words, the moving element 3 cannot be moved from the initial position to the opening position while the tamper-evident member 5 is present.

The tamper-evident member 5 extends above the top face 20 of the body element 2 in order to restrict any movement of the moving element 3. An overlap between the tear-off strip 5, or any other tamper-evident member, with the container which might be present below the top face 20 of the body element, is, however, not present. In particular, the tamper-evident member 5 of the present embodiment does not have any overlap with a container at all.

The spring element 4 is attached to the moving element 3 at the flattened portion 300 by means of a foil hinge 40.

Body element 2 also includes a desiccant chamber 6 which is situated at the bottom face 22 of the body element 2 and is directed towards the inside of a container. The desiccant chamber 6 is defined by means of a cylindrical wall 26 which also includes a fastening element 28 which is intended to keep the body element 2 in the closed position in the container. Fastening element 28 can be, for example, a so called olive which is intended to be in form fit with the inner surface of the container or any other means which provide for a reliable sealing and fitting of the body element 2 in the container.

Desiccant chamber 6 is closed, at the face pointing towards the inside of the container, with a moisture-permeable membrane 60 such that a desiccant material, and/or an oxygen absorber, and/or a gas absorber, which may be present in the desiccant chamber 6, can act to desiccate the volume defined by the container, and/or protect the volume from certain gases, in particular oxygen.

As an alternative or as a supplement to the desiccant chamber 6, the entire body element 2 can be made from a desiccant material, an oxygen absorber or a gas absorber, or from a polymer which includes a desiccant material, an oxygen absorber or a gas absorber in order to complement and/or support the desiccating and/or gas absorbing function.

Figure 2:
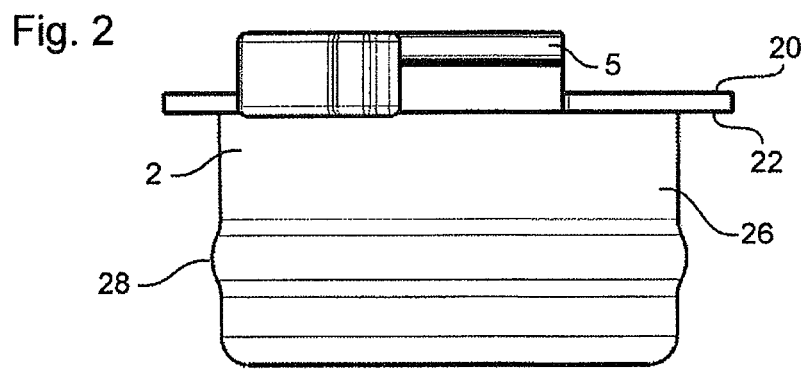
FIG. 2 is a perspective side view of the body element of the stopper according to FIG. 1.

FIG. 2 is a schematic perspective side view of the body element 2 shown in FIG. 1. Body element 2 has fastening element 28 provided in the form of the olive around the wall 26, wherein the olive 28 is intended to keep the body element securely and tightly fastened in the dispensing opening of the container.

Tamper-evident member 5 is provided at an edge of the top face 20 of the body element 2. From FIG. 2, it becomes apparent that the tamper-evident member 5 does not extend below the planed defined by the bottom face 22 of the body element 2.

Figure 3:
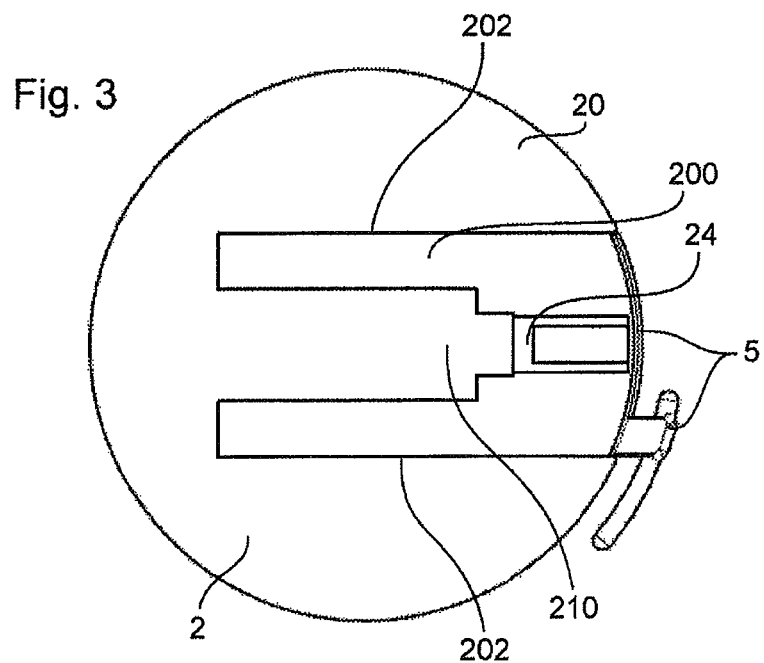
FIG. 3 is a top view of the body element of FIG. 2.

FIG. 3 shows the body element 2 and, in particular, the top face 20 of the body element 2 in a schematic top view. Nose 24 is present, which is used as a counter element for the spring element shown in FIG. 1. Rail elements 200, which are lifted above the flat surface 20 of the body element 2, are provided. The rail elements 200 are integrally moulded with the remainder of the body element 2. The rail elements 200 are intended to provide for a moving connection between the moving element 3 and the body element 2 in the form as schematically shown in FIG. 1.

Rail elements 200 define a space 210 between them, the space being intended to receive the spring element 4 of the moving element 3 as shown in FIG. 1. The rail elements 200 have, at their side edges 202, undercuts, preferably in the form to establish a dovetail lock, which are intended to receive respective counter-parts of the moving element 3.

FIG. 4 shows the moving element 3 in a bottom view in the arrangement in which it is manufactured. Moving element 3 is an injection moulded part which includes the spring element 4. Moving element 3 and spring element 4 are moulded integrally and are connected to one another by means of foil hinge 40 at the flattened portion 300 of the moving element 3.

The moving element 3 includes a recessed section 310 which is recessed with respect to the flat surface 30 of the lower face of the moving element 3. The recessed section 310 is intended to receive the spring element 4 and provides, at the same time, at its outer edges 302 undercut portions which are complementary to the undercut portions 202 of the body element 2. In other words, the moving element 3 can be moved from the side into the rail portions 200 of the body element 2, such that the moving element 3 can be moved back and forth along the rail elements 200, but cannot be lifted up in a direction perpendicular to the moving direction.

With respect to the actual manufacturing process of the moving element 3, the moving element 3 is injection moulded together with the spring element 4, substantially as a flat element. Spring element 4 is then folded back into the recessed section 310 of the moving element 3 about the foil hinge 40. Spring element 4 is then clicked into a clip 304 which extends above the recess section 310 such as to keep the spring element 4 in its active position, as shown in FIG. 5.

The moving element 3 in this position, namely with the readily-folded spring element 4, is then moved onto the respective rail portions 200 of the body element 2 from the direction opposite to the position of the tamper-evident member 5 (see FIG. 3). The moving element 3 can then be moved onto the rail portion 200 until the clip 304 of the moving element 3 clicks behind nose 24 such as to maintain the moving element 3 in its initial position and avoid that the moving element is pushed out of connection again by the spring element 4.

In other words, the clip 304 of the moving element 3 serves two functions, namely, on the one hand, to keep the spring element 4 in its folded, active position during the process step of moving the moving element 3 along the rail portions 200, and then, after the moving element 3 has been placed onto the top face 20 of the body element 2 and inserted into the respective rail portions 200, the clip 304 prohibits the moving element 3 to move backwards out of its initial position in a direction opposite to the direction towards the tamper-evident element 5.

To this end, the clip 304 preferably has a shape as indicated in FIG. 1, namely a shape which is smooth and preferably has an inclination such as to support the moving element 3 when being moved over nose 24 in the direction towards the tamper-evident element 5. Clip 304 has on the surface opposite to the direction pointing towards the tamper-evident member 5, a sharp and preferably perpendicular surface in order to ensure that the moving element 3 cannot be moved, from its initial position shown in FIG. 1, in a direction opposite to direction X, i.e. out of connection with nose 24.

FIG. 6 shows a schematic cross-section through a container 8 in which the stopper 1 is inserted. It becomes apparent that into the container 8 a skirt 7 is inserted, into which the stopper 1 is inserted. Skirt 7 represents, at its upper end 70, the dispensing opening for the products that might be included in the volume 80 of the container.

Skirt 7 is attached to the container 8 by means of a connecting ring 72 which may be glued or pressed into the container 8, or by means of any other suitable mounting technique.

Skirt 7 includes a flow reducer 74, which is intended to reduce the number of products that can be dispensed through the dispensing opening 70 as soon as the stopper 1 is removed from the dispensing opening 70.

To provide an efficient desiccation of the volume 80 of the container 8, the skirt 7 can be made from a desiccant material or from a material which includes a desiccant, and/or an oxygen absorber and/or a gas absorber. Furthermore, in the desiccant chamber 6 of the body element 2 of the stopper 1, a desiccant material can be likewise present.

In the embodiments described herein, the stopper may include means to regulate the gaseous atmosphere within the volume 80 of the container. The means may include active substances in the form of the desiccant material, oxygen absorbers or gas absorbers mentioned above, but may also include any sort of absorbers, scavengers, active carbons, means for moisture control, means for oxygen control and the like. These substances may be situated in a hollow space which is defined in the body element 2 and which may be sealed off by a gas permeable membrane.

In order to attach the body element 2 to the skirt 7, fastening elements 28 in the form of the olive are provided at the body element 2, which can be received in respective counter-part 78 of the skirt 7. Accordingly, a positive lock/form lock of the body element 2 in the skirt 7 can be achieved, such that the dispensing opening 70 of the skirt 7 can be reliably and moisture-tightly sealed.

FIG. 7 shows the container 8 in a schematic perspective outer view such that container 8 and stopper 1 can be seen from the outside. As to the stopper 1, the body element 2 is only shown in the form of a ring which sits on top of the upper edge 82 of the container 8 but which does not at all extend beyond the outer contours of the container 8 in the plane of the top face 20 of the body element 2.

The presence of the unstructured surface 350 of the moving element 3 offers the possibility of easily printing indicia or instructions onto the top surface by different methods, for example by hot-die printing, hot stamping, serigraphy, tampo printing or by using in-mould labelling or engraving in the mould techniques.

From FIG. 7 it also becomes apparent that the outer dimensions D3 of the moving element 3 in the plane of the top face 20 are equal to or smaller than the outer dimensions D2 of the body element 2 and/or than the outer dimensions D8 of the container 8. For a cylindrical container 8, the outer dimensions D2, D3 and D8 substantially correspond to diameters of the respective parts.

It has to be observed that the outer dimensions D2 of the body element 2 are also equal to, or smaller than the outer dimensions D8 of the container. This is even more so the case at position 82 where the container 8 connects to the body element 2. This specific configuration has the effect that it is impossible, without the aid of the gripping portion provided by the moving element 3 in the opening position, to grip the body element 2 and open the dispensing opening of the container.

Moving element 3 is placed on top of the top face 20 of the body element 2, wherein the moving element 3 does likewise not extend beyond the outer dimensions of the body element 2, nor of the container 8 in the plane of the top face 20 of the body element 2.

As can be easily appreciated from FIG. 7, moving element 3 substantially covers the entire top face 20 of the body element 2. In particular, no section of the body element 2 extends beyond the moving element 3 in a direction perpendicular to the plane of the top face 20 of the body element 2. This implies that the moving element 3 is the only element which is present at the top face of the stopper.

In order to open the dispensing opening of the container 8, first of all the tamper-evident member 5 needs to be removed and then the moving element 3 be moved from its initial position, as shown in FIG. 4, towards its opening position in which it provides for a gripping means to remove the body element from the dispensing opening.

The process for opening the container is shown, schematically, in FIGS. 8 to 10.

In FIG. 8, the container 8 and the body element 2 are shown in the closed position. The moving element 3 is in its initial position and arrow A1 indicates that the tamper-evident member 5 is to be removed in order to start the opening process of the container 8, as the first action.

In FIG. 9, the tamper-evident member is already removed and arrow A2 indicates that the moving element 3 is to be moved into the direction in which the tamper-evident element 5 used to be present, in order to move the moving element 3 from its initial position into its opening position, as the second action.

FIG. 10 shows schematically the moving element 3 in its opening position, i.e. in a position in which the moving element 3 extends beyond the dimensions defined by the top face 20 of the body element 2. A gripping surface 32 is provided by means of a section of the lower face of the moving element 3 which can be used by a user to apply a force in the direction of arrow A3 in order to remove the body element 2 from the dispensing opening of the container 8, as the third action.

Accordingly, in order to open the dispensing opening of the container 8 for the first time, actions A1, A2 and A3 are to be carried out, consecutively. After the container 8 has been opened for the first time, actions A2 and A3 have to be carried out, consecutively. The rather complex movements required for opening the container provide for improved childproof characteristics.

FIGS. 11 to 14 show a stopper 1 in a different embodiment, having a different arrangement of the spring element 4. Spring element 4 has a semi-circular shape, as can be readily appreciated from FIG. 11 which shows a bottom view of the moving element 3. The spring element 4 is, substantially as in the previous embodiment, hinged to the moving element 3 via a foil hinge 40 at the flattened end 300 of the moving element 3.

A clip 304, guide rails 302 and a recessed portion 310 for receiving the spring element 4 are present as in the embodiment discussed with respect to FIGS. 4 and 5.

The spring element 4 of FIG. 11 is integrally moulded with the remainder of the moving element 3 and is folded about the foil hinge 40 towards the recess 310 of the moving element 3 such that it is situated in the form as shown in FIG. 11.

FIG. 12 shows a schematic cross-section through the stopper 1, including the body element 2, the moving element 3 and the skirt 7. In this Figure, the moving element 3 is in its initial position such that it substantially covers the entire top surface of the stopper. The spring element 4 abuts against a counter-surface 240 which is present at the top surface 20 of the body element 2.

In FIG. 13, the stopper 1 of FIG. 12 is shown with the moving element 3 moved into the opening position such that a gripping surface 32 becomes available in order to apply a force to the stopper for opening it. In particular, by applying a force to the gripping surface 32 the body element 2 together with the moving element 3 can be removed from the skirt 7.

FIG. 14 shows an exploded view of the arrangement of the moving element 3, the body element 2 and the skirt 7.

FIGS. 15 to 18 show yet another embodiment of a stopper. The layout of moving element 3, body element 2 and skirt 7 is substantially the same as that in the previous embodiment such that repeated description thereof will be omitted.

The spring element 4 is, however, in the present embodiment made as a part separate from the moving element 3. The spring element 4 may be provided in the form of the elastic ring shown in FIG. 15 and may be situated in a specifically shaped portion of the recess 310. By the provision of the recess 310 in the form as shown in FIG. 15, namely such that it provides support for the ring-shaped spring element 4, the end of the moving element 3 at which the spring element 4 is situated can be fully closed. This has the advantage that the flattened portion shown at reference numeral 300 in FIG. 11 can be avoided. In other words, the covering of the body element 2 by means of the moving element 3 is further improved.

The ring-shaped spring element 4 can be made from a different material than the moving element 3.

FIG. 16 shows that the moving element 3 covers, in its initial position, the body element 2 even better than in the previous embodiments. In particular, at the left hand side in which in the previous embodiments the flattened portion 300 was present, is no such portion anymore.

FIG. 17 shows the moving element 3 in the opening position, providing a gripping surface 32, and FIG. 17 shows an exploded view of the parts.

In this embodiment, a tamper evidence member 5 is provided which has to be removed in order to allow for the initial moving movement from the initial position towards the opening position of the moving element 3.

In the embodiment shown in FIGS. 19 to 22, a spring element 4 in the form of the ring-shaped spring element 4 of the previous embodiment is shown. This ring-shaped spring element 4 is situated in a portion of the recess 310 of the moving element 3.

The difference between the previous embodiment and the present embodiment is that no tamper evidence member is provided.

Figure 23:
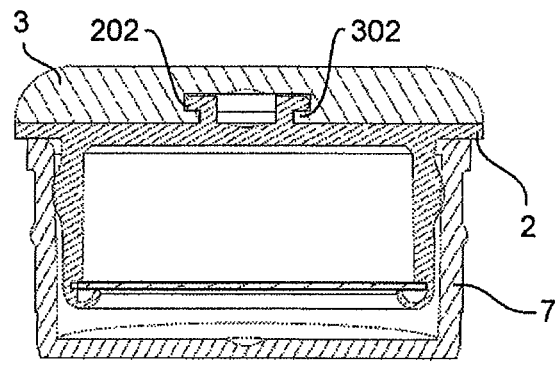
FIG. 23 is a schematic cross-section through a stopper in a plane perpendicular to the moving plane, showing an embodiment of positive locking rail elements.

FIG. 23 shows a cross section through a stopper in a plane perpendicular to the plane of FIGS. 1, 12, 13, 16, 17, 20 and 21 and is intended to clearly but schematically show the rail connection between the moving element 3 and the body element 2. In particular, the rail elements 202 and 302 of the body element 2 and the moving element 3, respectively, are shown to be provided in an interlocking form. The undercuts of the rail elements 202 of the body element 2 are in connection with the protuberances of the rail elements 302 of the moving element 3 such that the moving element can be moved in a direction perpendicular to the plane of the cross-section.

Figure 24:
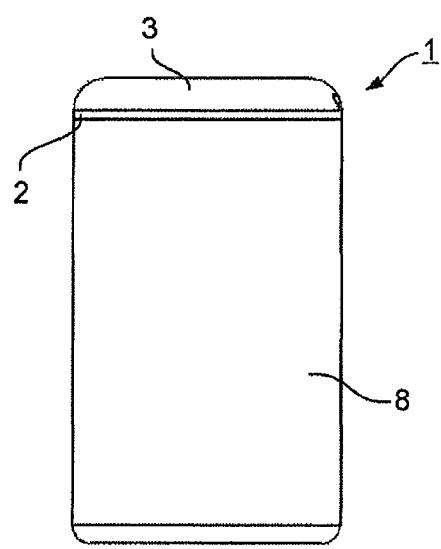
FIG. 24 is a schematic perspective view of a container with a stopper according to the present disclosure, the stopper having a moving element covering the entire top face of the body element and the skirt, the moving element being in its initial position.

FIG. 24 is a schematic perspective view on a container 8 with a stopper 1 according to the present disclosure. It becomes apparent that the outer contours of the container with the stopper in its initial position are considerably smooth. In particular, there is no dedicated gripping surface which would enable removing the stopper to open the container 8.

Figure 25:
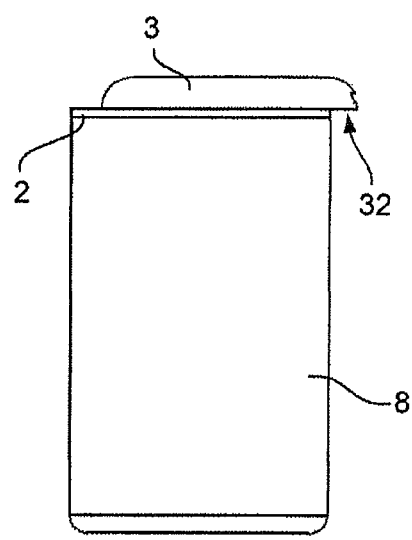
FIG. 25 is a schematic perspective view of the container of FIG. 24 with the moving element in the opening position.

FIG. 25 shows the container 8 of FIG. 24 with the moving element 3 moved into the opening position. Accordingly, a gripping surface 32 is provided below which the user can grip and lift the stopper in order to access the contents of the container 8.

The stoppers described in the various embodiments above are particularly well suited for packaging drugs, in particular drugs which need a controlled gaseous atmosphere in the container in which they are intended to be packaged.

The invention claimed is:

1. Stopper for closing a dispensing opening of a container comprising:
    a body element for closing the container and its dispensing opening, comprising a top face and a bottom face, wherein the bottom face is directed towards an inside of the container and contacts an upper side of the container and the top face is directed away from the inside of the container and wherein the top face and the bottom face are dimensioned to cover the upper edges of the container when viewed from above and thus fully close the container;
    a moving element, which substantially covers the entire top face of the body element, wherein the moving element is slidingly movable in a linear direction relative to the body element from an initial position in which the moving element does not extend beyond an outer extension of the top face in a plane of the top face of the body element, to an opening position wherein the moving element is slidingly moved relative to the body element to extend at least partly beyond the outer extension of the top face of the body element in the plane of the body element, wherein the moving element comprises in the open position, a gripping surface for a user to remove the body element from the dispensing opening, and wherein the moving element substantially covers the top face of the body element when in the initial position.

2. Stopper according to claim 1, wherein the body element further comprises a desiccant chamber situated at the bottom face of the body element, wherein the body element is made at least partly from a material selected from the group consisting of a desiccant material, an oxygen absorber and a gas absorber.

3. Stopper according to claim 1, wherein the top face of the body element has dimensions smaller than, or equal to, outer dimensions of the container in the plane of the top face of the body element and wherein the moving element has dimensions smaller than or equal to the dimensions of the top face of the body element in the plane of the top face of the body element and to the container at a position in which the body element is connected to the container and wherein the body element does not extend beyond the plane defined by the moving element in a direction perpendicular to a plane defined by the moving element.

4. Stopper according to claim 1, wherein the moving element is mounted to the top face of the body element by a positive locking rail element to allow movement of the moving element from the initial position to the opening position and wherein the moving element is mounted to the body element by mounting means situated at a bottom face of the moving element.

5. Stopper according to claim 1, wherein the moving element is spring-biased towards the initial position, by a spring element which is integrally moulded with the moving element in the same plane as the moving element and is hinged to the moving element by a foil hinge.

6. Stopper according to claim 5, wherein the spring element is associated with the moving element, and is situated in a recess of the moving element.

7. Stopper for closing a dispensing opening of a container comprising:
   a body element for closing the dispensing opening, comprising a top face and a bottom face, wherein the bottom face is directed towards an inside of the container;
   a moving element, on the top face of the body element, wherein the moving element is movable relative to the body element from an initial position in which the moving element does not extend beyond an outer extension of the top face in a plane of the top face of the body element, to an opening position wherein the moving element is moved relative to the body element to extend at least partly beyond the outer extension of the top face of the body element in the plane of the body element,
   wherein the moving element comprises in the open position, a gripping surface for a user to remove the body element from the dispensing opening,
   wherein the moving element substantially covers the top face of the body element when in the initial position,
   wherein the moving element is spring-biased towards the initial position, by a spring element which is integrally moulded with the moving element in the same plane as the moving element and is hinged to the moving element by a foil hinge, and
   wherein the moving element further comprises a recessed portion including a positive locking element to movably connect the moving element with the body element, wherein the recessed portion is dimensioned to receive the spring element.

8. Stopper for closing a dispensing opening of a container comprising:
   a body element for closing the dispensing opening, comprising a top face and a bottom face, wherein the bottom face is directed towards an inside of the container;
   a moving element, on the top face of the body element, wherein the moving element is movable relative to the body element from an initial position in which the moving element does not extend beyond an outer extension of the top face in a plane of the top face of the body element, to an opening position wherein the moving element is moved relative to the body element to extend at least partly beyond the outer extension of the top face of the body element in the plane of the body element,
   wherein the moving element comprises in the open position, a gripping surface for a user to remove the body element from the dispensing opening, and
   wherein the moving element substantially covers the top face of the body element when in the initial position, and
   further comprising a tamper-evident member which prohibits movement of the moving element from the initial position to the opening position, wherein the tamper-evident member is removable by a user, and wherein the tamper-evident member extends above the top face of the body element and is integrally moulded with the body element.

9. Stopper according to claim 1 further comprising a skirt which when inserted into the container defines a dispensing opening, wherein the body element is insertable into the skirt in order to close the dispensing opening, and wherein the skirt comprises a flow reducer to reduce the flow of products to be dispensed through the dispensing opening.

10. Stopper according to claim 9, wherein the body element is hinged to the container by a foil hinge hinged to the skirt.

11. Stopper according to claim 1, wherein the top surface of the moving element further comprises a hot-die print, a hot stamp print, a serigraphy, a tampo print, an in-mould print, or an engraving of the mold.

12. Stopper according to claim 1, wherein the moving element is slidingly movable in a linear rotational direction from the initial position to the opening position.

13. Method for manufacturing the stopper of claim 1 comprising
   moulding the moving element including a spring element, wherein the spring element is moulded in a plane of the moving element;
   folding the moving element below the moving element; and
   mounting the moving element to the body element.

14. Stopper of claim 1 wherein the body element is made at least partially of a material selected from the group consisting of a resin and a desiccant, a resin and an oxygen absorber and a resin and a gas absorber.

15. Stopper of claim 4 wherein the positive locking rail element comprises a dovetail positive lock.

16. Stopper of claim 6 wherein the composition of the spring element is different from the composition of the moving element.

17. Stopper of claim 7 wherein a clip element is provided in the recessed portion which maintains the spring element in its active position and blocks the moving movement of the moving element in one direction.

18. Stopper of claim 9 wherein the skirt further comprises a material selected from the group consisting of a desiccant material, an oxygen absorber and a gas absorber.

19. Stopper of claim 9 wherein the skirt further comprises a material selected from the group consisting of a resin and a desiccant material, a resin and an oxygen absorber, and a resin and a gas absorber.

* * * * *